US012458986B2

(12) United States Patent
Cirulis et al.

(10) Patent No.: US 12,458,986 B2
(45) Date of Patent: Nov. 4, 2025

(54) DETECTION OF CYCLONE WEAR OR DAMAGE USING INDIVIDUAL CYCLONE OVERFLOW MEASUREMENT

(71) Applicant: CiDRA Corporate Services Inc., Wallingford, CT (US)

(72) Inventors: Dylan Cirulis, Salt Lake City, UT (US); Robert J. Maron, Middletown, CT (US); Christian V. O'Keefe, Durham, CT (US); Paul J. Rothman, Windsor, CT (US); David V. Newton, Madison, CT (US); Joseph Mercuri, Wallingford, CT (US); Juan F. Medina, West Jordan, UT (US)

(73) Assignee: CIDRA CORPORATE SERVICES INC., Wallingford, CT (US)

( * ) Notice: Subject to any disclaimer, the term of this patent is extended or adjusted under 35 U.S.C. 154(b) by 335 days.

(21) Appl. No.: 15/541,787

(22) PCT Filed: Jan. 28, 2016

(86) PCT No.: PCT/US2016/015334
§ 371 (c)(1),
(2) Date: Jul. 6, 2017

(87) PCT Pub. No.: WO2016/123323
PCT Pub. Date: Aug. 4, 2016

(65) Prior Publication Data
US 2018/0272362 A1   Sep. 27, 2018

Related U.S. Application Data

(60) Provisional application No. 62/108,689, filed on Jan. 28, 2015.

(51) Int. Cl.
*B04C 11/00* (2006.01)
*G01N 15/00* (2024.01)
(Continued)

(52) U.S. Cl.
CPC .............. *B04C 11/00* (2013.01); *G01N 15/02* (2013.01); *G01N 15/10* (2013.01); *G01N 2015/0053* (2013.01); *G01N 2015/1029* (2024.01)

(58) Field of Classification Search
CPC ......... B04C 11/00; H04R 29/00; G08B 21/18; G01N 15/10; G01N 15/02; G01N 2015/0053; G01N 2015/1087
See application file for complete search history.

(56) References Cited

U.S. PATENT DOCUMENTS 6,874,364 B1   4/2005 Campbell et al.
7,213,475 B2 *  5/2007 Coghill .............. G01N 15/0656
                                                          73/865.5
(Continued)

FOREIGN PATENT DOCUMENTS

WO   1991007231 A1   5/1991

*Primary Examiner* — Stephen D Meier
*Assistant Examiner* — Leo T Hinze
(74) *Attorney, Agent, or Firm* — William J. Barber; WARE FRESSOLA MAGUIRE & BARBER LLP

(57) ABSTRACT

Apparatus features a signal processor or signal processing module configured to: receive signaling containing information about an acoustic noise profile that is directly measured and generated by a slurry hitting a probe configured in a part of a cyclone; and determine corresponding signaling containing information about the status of the part of the cyclone, based upon the signaling received. The signal processor or signal processing module is configured to provide the corresponding signaling, including where the corresponding signaling provided contains information about whether the part of the cyclone is damaged or worn. The part of the cyclone is an apex of the cyclone, and the corresponding signaling contains information about the status of the apex of the cyclone.

29 Claims, 14 Drawing Sheets

(51) Int. Cl.
  *G01N 15/02* (2024.01)
  *G01N 15/10* (2024.01)

(56) References Cited

U.S. PATENT DOCUMENTS

| | | |
|---|---|---|
| 2005/0011258 A1 | 1/2005 | Gysling et al. |
| 2005/0021246 A1 | 1/2005 | Olson |
| 2005/0173354 A1 | 8/2005 | Binot et al. |
| 2012/0209550 A1 | 8/2012 | Van Der Spek et al. |
| 2016/0207050 A1* | 7/2016 | Van Der Spek ....... G01N 15/02 |

\* cited by examiner

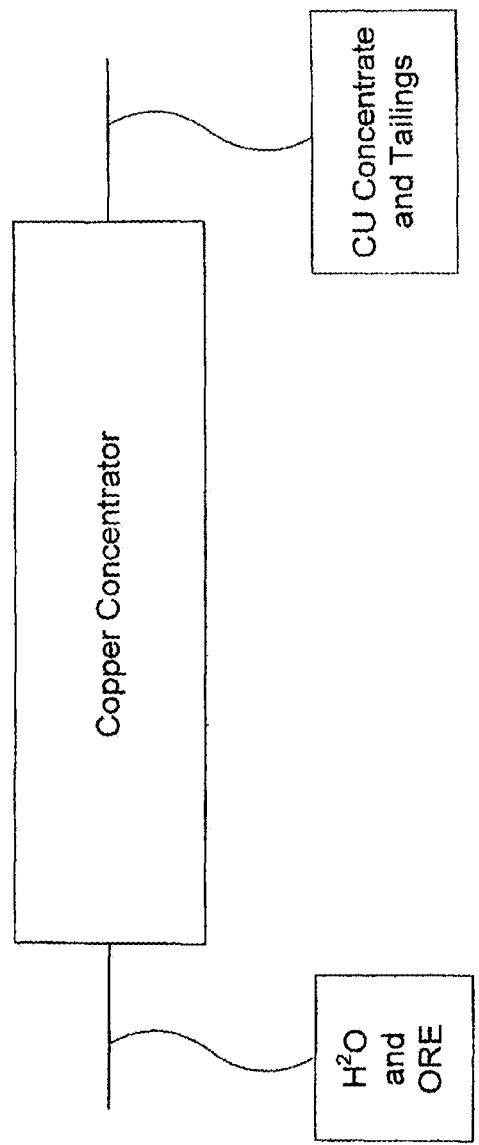
FIGURE 1A: Mineral Extraction Processing System - Prior Art

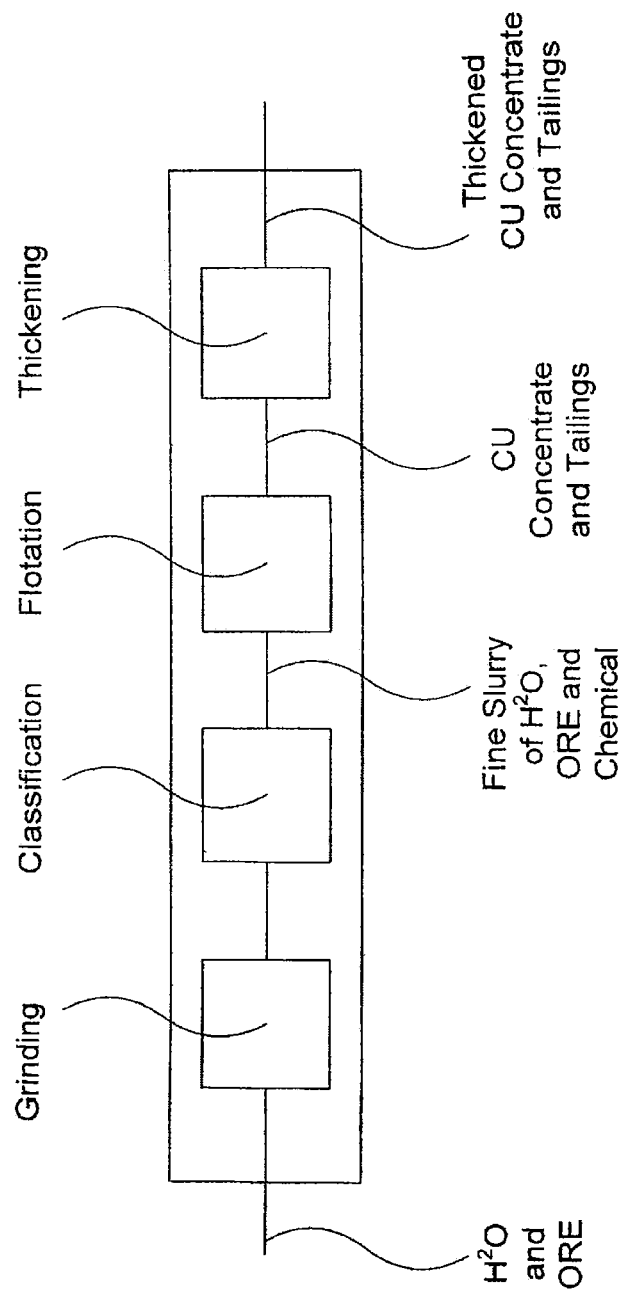
FIGURE 1B: - Prior Art

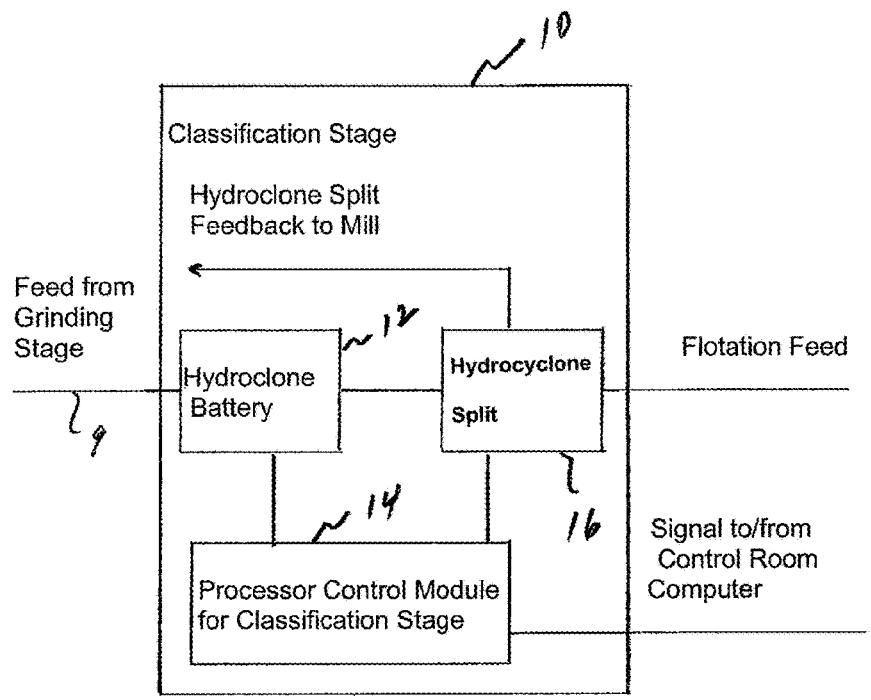
FIGURE 2: Classification Stage - Prior Art
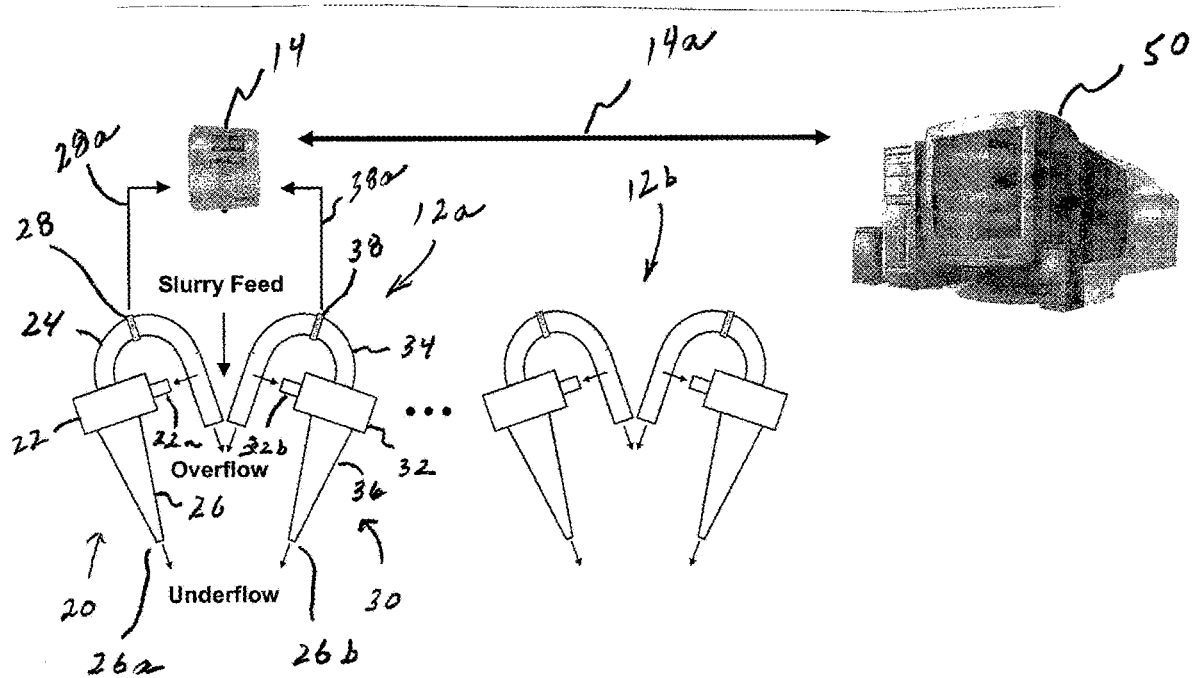
Figure 3 - PRIOR ART Apparatus 100

Signal processor or processing module 102 configured at least to:

receive signaling $S_{in}$ containing information about an acoustic noise profile that is measured and generated by a slurry hitting a probe configured in a part of a cyclone; and determine corresponding signaling containing information about the status of the part of the cyclone, based upon the signaling received; and/or provide the corresponding signaling $S_{out}$, including where the corresponding signaling $S_{out}$ contains information about whether the part of the cyclone is damaged or worn.

$S_{in}$ — Other signal processor circuits or components 104 that do not form part of the underlying invention, e.g., including input/output modules, one or more memory modules, data, address and control busing architecture, etc. — $S_{out}$ Figure 4A: The Basic Apparatus

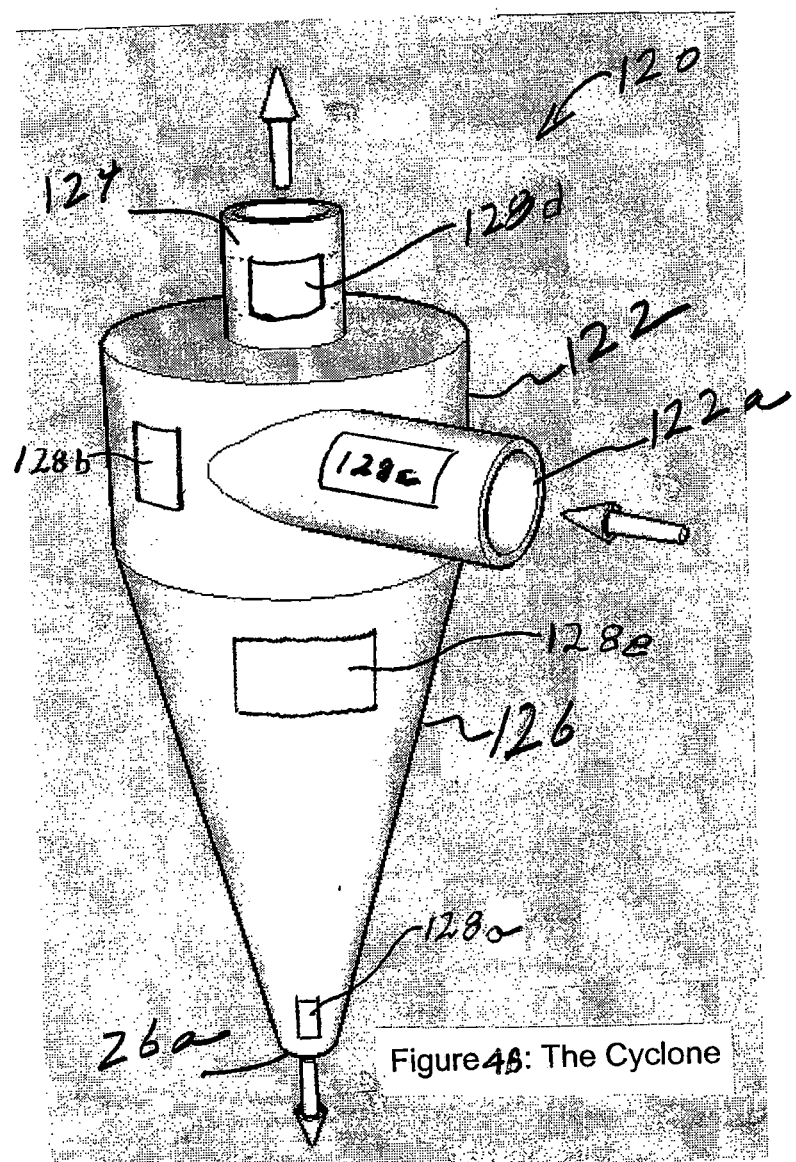
Figure 4B: The Cyclone

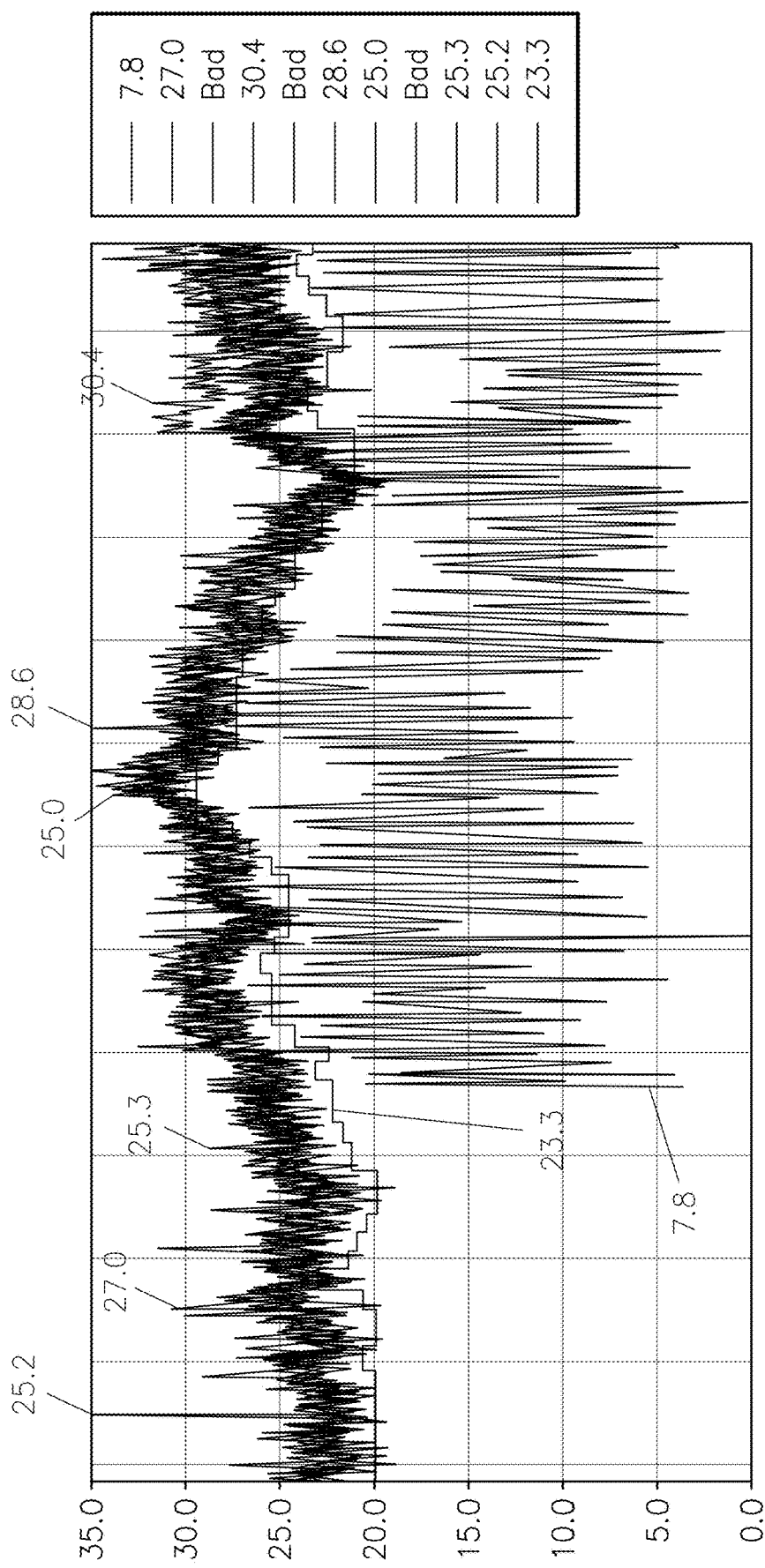
FIG. 6: Cyclone Performance Monitoring – Detecting Wear Characteristics
(Note: Erratic Cyclone readings)

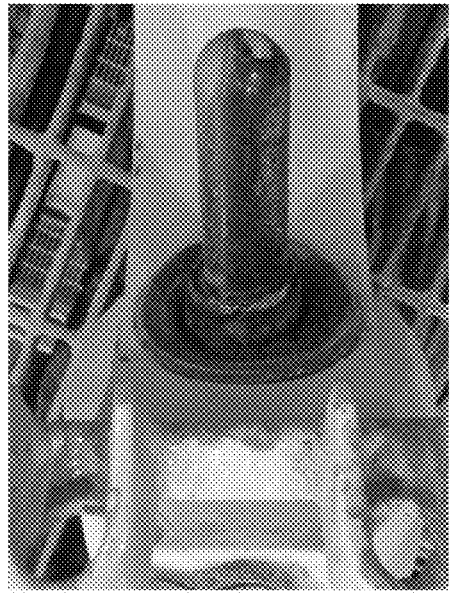
FIG. 7A: Upside
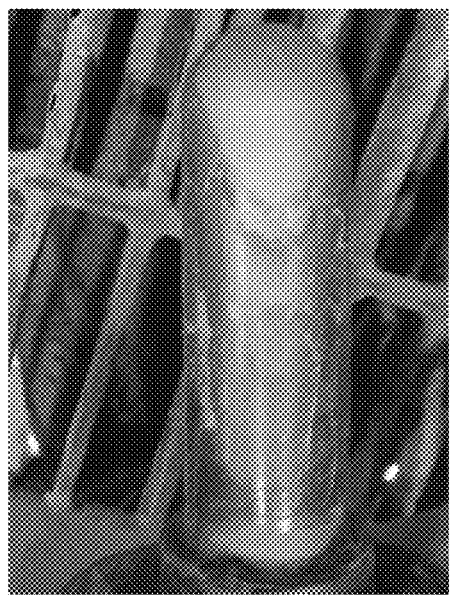
FIG. 7B: Right side
FIG. 7C: Downside
FIG. 7: Application 1

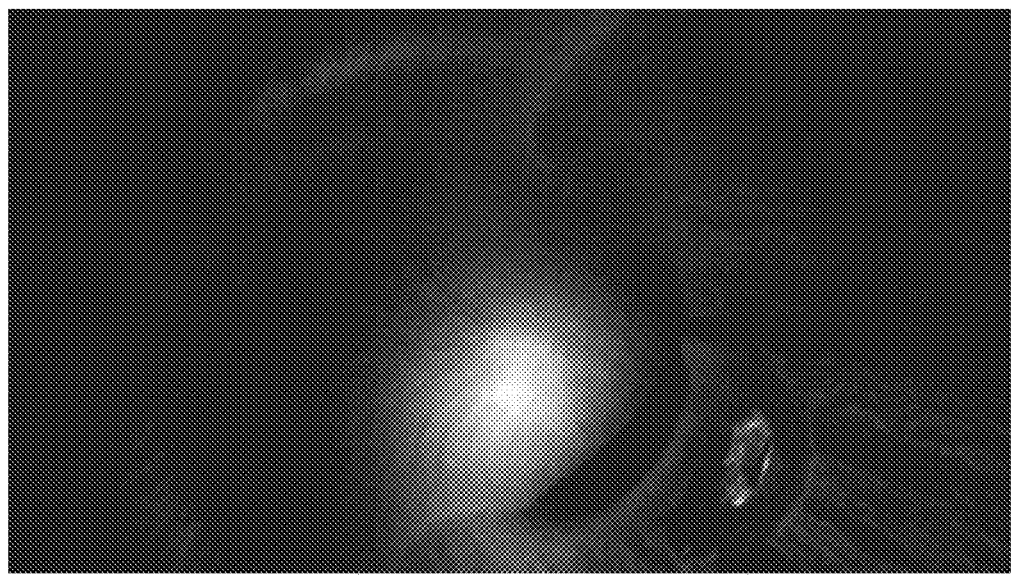
*FIG. 8A*: Photo of inside of the O/F pipe
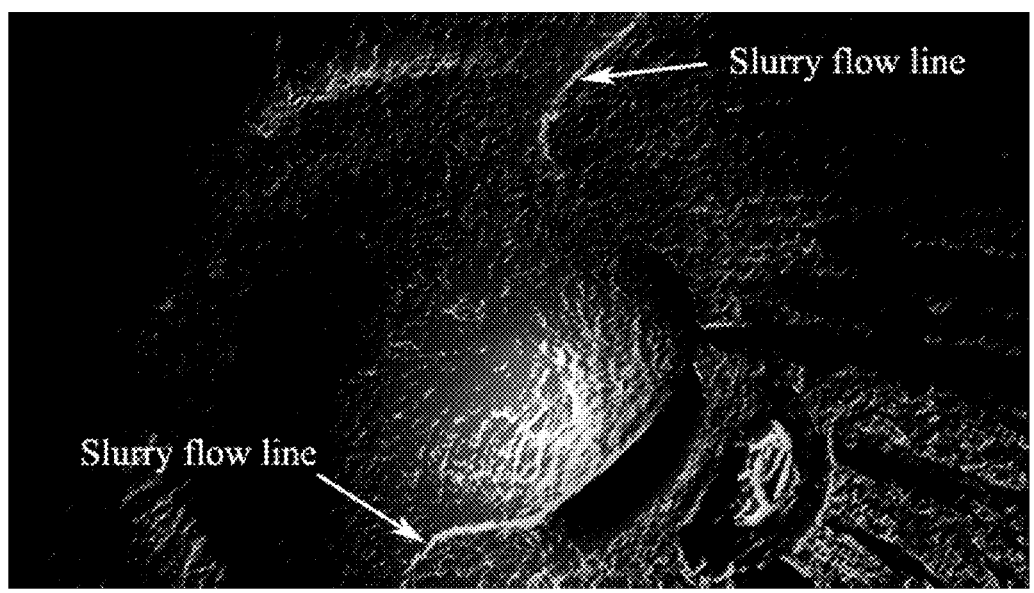
*FIG. 8B*: Photo of inside of the O/F pipe
*FIG. 8*: Photos of inside of O/F pipe

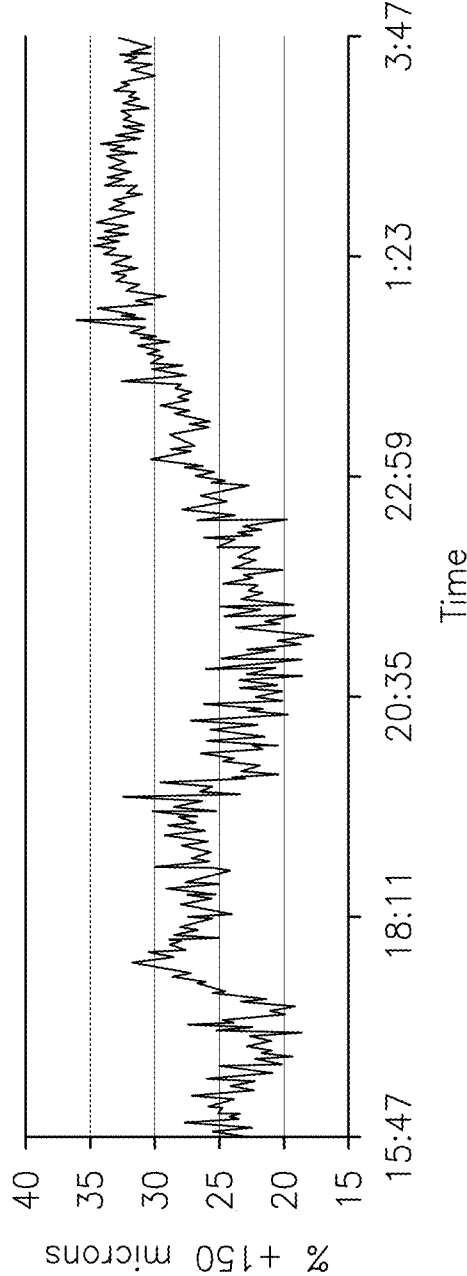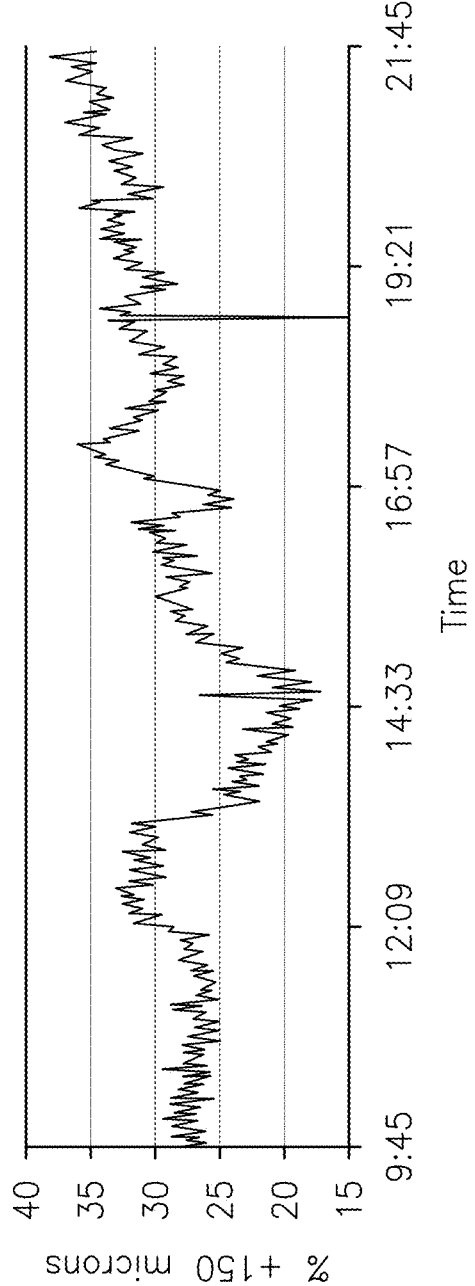
FIG. 9A: Hydrocyclone before replacement
FIG. 9B: Hydrocyclone after replacement
FIG. 9

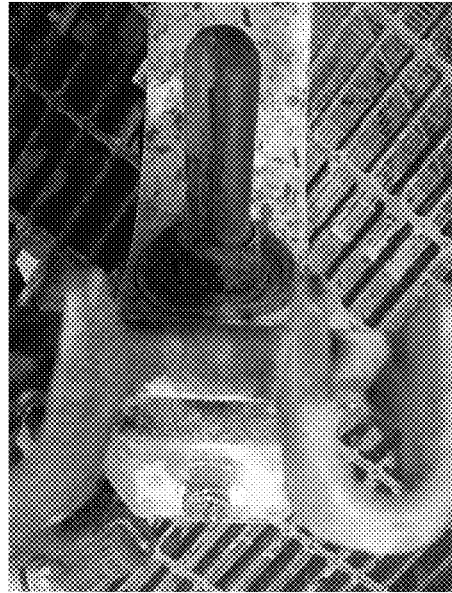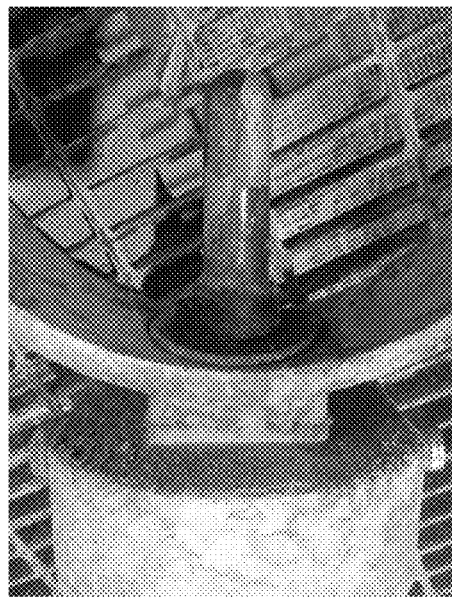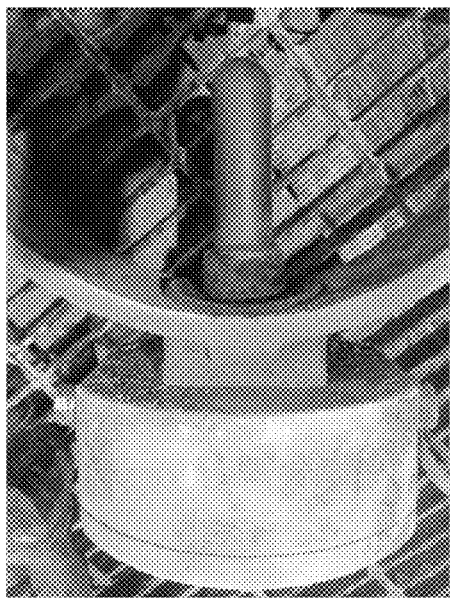
FIG. 11A: Downside
FIG. 11B: Right side
FIG. 11C: Upside
FIG. 11: Photos of PST Probe

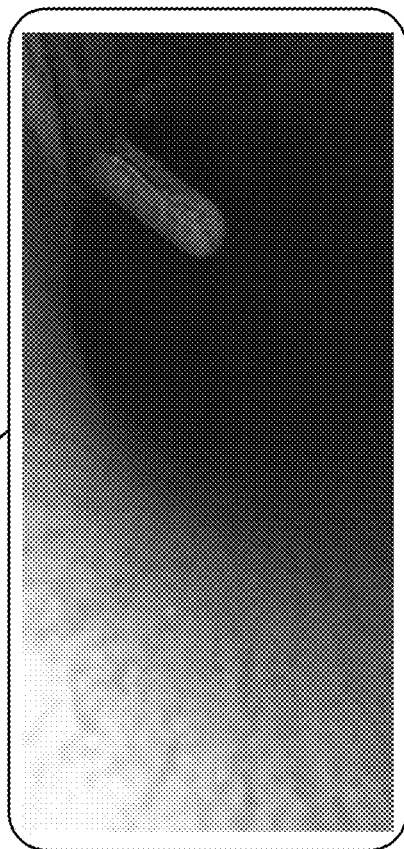
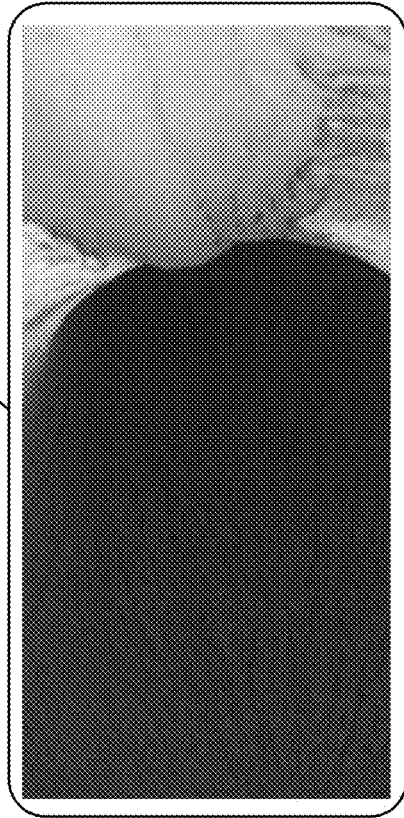
FIG. 12A
FIG. 12B
FIG. 12C
FIG. 12: Photos of inside of the O/F pipe

DETECTION OF CYCLONE WEAR OR DAMAGE USING INDIVIDUAL CYCLONE OVERFLOW MEASUREMENT

CROSS-REFERENCE TO RELATED APPLICATIONS

This application claims benefit to provisional patent application Ser. No. 62/108,689, filed 28 Jan. 2015; which is incorporated by reference in its entirety.

This application is related to PCT patent application serial no. PCT/US14/52628, filed 26 Aug. 2014, which claims benefit to provisional patent application Ser. No. 61/869,901, filed 26 Aug. 2013, which are both incorporated by reference in their entirety.

This application is related to patent application Ser. No. 13/389,546, which corresponds to PCT/US10/45178, filed 11 Aug. 2010, claiming benefit to provisional patent application serial nos. 61/232,875, filed 11 Aug. 2009; Ser. No. 61/400,819, filed 2 Aug. 2010; and Ser. No. 61/370,154, filed 3 Aug. 2010, which are all incorporated by reference in their entirety.

This application is also related to patent application Ser. No. 13/377,083, which corresponds to PCT/US10/38281, filed 11 Jun. 2010, claiming benefit to provisional patent application serial nos. 61/186,502, 12 Jun. 2009, which are all incorporated by reference in their entirety.

This application is related to patent application Ser. No. 12/991,636, which corresponds to PCT/US09/43438, filed 11 May 2009, claiming benefit to provisional patent application serial nos. 61/051,775, 61/051,781, and 61/051,803, all filed 9 May 2008, which are all incorporated by reference in their entirety.

The aforementioned applications were all assigned to the assignee of the present application, which builds on this family of technology.

BACKGROUND OF THE INVENTION

1. Field of Invention

This invention relates to a technique for optimizing the performance of cyclones, e.g., operating in a hydrocyclone battery in a mineral extraction processing system, including extracting a mineral from ore.

2. Description of Related Art

General Background

In many industrial processes the sorting, or classification, of product by size is critical to overall process performance. A minerals processing plant, or beneficiation plant, is no exception. In the case of a copper concentrator as shown in FIG. 1A, the input to the plant is water and ore (of a particular type and size distribution) and the outputs are copper concentrate and tailings. The process consists of a grinding, classification, floatation, and thickening, as shown in FIG. 1B. The grinding and classification stage produces a fine slurry of water and ore, to which chemicals are added prior to being sent to the flotation stage. Once in the flotation stage, air is used to float the copper mineral while the gangue (tailings) is depressed. The recovered copper is cleaned and dried. The tailings are thickened and sent to the tailings pond. The classification stage is critical to the performance of two areas of the process. These areas are the grinding throughput and flotation recovery, grade and throughput.

A grinding operation may include a screens and crusher stage and a mill stage, that is typically configured mills in closed circuit with a hydrocyclone battery. A hydrocyclone is a mechanical device that will separate a slurry stream whereby the smaller particles will exit out the overflow line and the larger particles will exit out the underflow line. The overflow is sent to the flotation circuit and the underflow is sent back to the mill for further grinding. A collection of these devices is called a battery. A hydrocyclone will be sized based on the particular process requirements. The performance of the hydrocyclone is dependent on how well it is matched to the process conditions. Once the proper hydrocyclone has been chosen and installed, it must be operated within a specific range in order to maintain the proper split between the overflow and the underflow. The split is dependent on slurry feed density and volumetric flow into the device. A typical control system will use a combination of volumetric flow, feed density and pressure across the hydrocyclone to control the split. Because of the harsh environmental and process conditions all of these measurements suffer from maintenance and performance issues. This can result in reduced classification performance and reduced mill throughput. Flotation performance is highly dependent on the particle size distribution in the feed which comes from the battery overflow, thus it is dependent on the hydrocyclone classification performance. The mill throughput is highly dependent on the circulation load which comes from the battery underflow. Traditionally hydrocyclone performance has been determined by evaluating manually collected samples from the consolidated hydrocyclone battery overflow stream. This technique is time consuming; the accuracy is subject to sampling techniques; the sample is a summation of all the hydrocyclones from the battery; and has a typical 24 hour turnaround time. Therefore it is not possible to implement a real time control algorithm to monitor, control, and optimize the each individual hydrocyclone.

Real time monitoring of each individual hydrocyclone would provide the ability to track the performance of individual hydrocyclones. This would enable the following:
- The detection of hydrocyclones that require maintenance or have become plugged.
- The detection of operational performance instabilities that cause extended periods of roping or surging.
- The detection of chronic problems with certain hydrocyclones.
- Tighter classification control with changing throughput demands and feed densities.
- Increased up time or availability of the hydrocyclone battery.

Moreover, FIG. 2 shows a classification stage generally indicated as 10 that may form part of a mineral extraction processing system, like the one shown in FIGS. 1A and 1B for extracting minerals from ore. The classification stage 10 includes a hydrocyclone battery 12 that receives a feed from a grinding stage, as shown in FIG. 1B. The hydrocyclone battery 12 is configured to respond to signaling from a signal processor or processor control module 14, and provide an effluent, e.g., a fine slurry or slurry feed, to a flotation stage shown in FIG. 1B. The classification stage 10 also may include a hydrocyclone split 16 that receives the slurry from the hydrocyclone battery 12, and also may receive signaling from the signal processor or processor control module 14, and may provide some portion of the slurry back to the mill stage shown in FIG. 1B, and may also provide another portion of the slurry as a flotation feed to a flotation stage shown in FIG. 1B. The signal processor or processor control module 14 may also send to or receive from one or more signals with a control room computer 50 (see FIG. 3A). The technique to track the flow performance of individual cyclones operating in parallel on a single battery is described in relation to the hydrocyclone battery 12 (i.e. the single battery), the signal processor or processor control module 14 and the cooperation of these two components.

FIG. 3 shows the hydrocyclone battery 12 (i.e. the single battery), the signal processor or processor control module 14 and the cooperation of these two components according to some embodiments of the present invention. For example, the hydrocyclone battery 12 may include a first and second hydrocyclone pair 12a, 12b. The first hydrocyclone pair 12a includes a first hydrocyclone 20 and a second hydrocyclone 30. The first hydrocyclone 20 has a cylindrical section 22 with an inlet portion 22a for receiving via a feed pipe 9 the feed from the grinding stage shown in FIG. 1B, an overflow pipe 24 for providing one portion of the fine slurry or slurry feed to either the flotation stage shown in FIG. 1B, or the hydrocyclone split 16 shown in FIG. 2, and has a conical base section 26 with underflow outlet 26a for providing a remaining portion of the fine slurry or slurry feed.

Similarly, the second hydrocyclone 30 has a cylindrical section 32 with an inlet portion 32a for receiving the feed from the grinding stage shown in FIG. 1B, an overflow pipe 34 for providing one portion of the fine slurry or slurry feed to either the flotation stage shown in FIG. 1B, or the hydrocyclone split 16 shown in FIG. 2, and has a conical base section 36 with underflow outlet 36a for providing a remaining portion of the fine slurry or slurry feed.

As one skilled in the art would appreciate, the first and second hydrocyclones 20, 30 classify, separate and sort particles in the feed from the grinding stage based at least partly on a ratio of their centripetal force to fluid resistance. This ratio is high for dense and course particles, and low for light and fine particles. The inlet portion 22a, 32a receives tangentially the feed from the grinding stage shown in FIG. 1B, and the angle and the length of the conical base section 26, 36 play a role in determining its operational characteristics, as one skilled in the art would also appreciate.

In the example shown in 3, at least one sensor 28 may be mounted on the overflow pipe 24 that is configured to respond to sound propagating in the overflow pipe 24 of the cyclone 20, and to provide at least one signal containing information about sound propagating through the slurry flowing in the overflow pipe 24 of the cyclone 20. Similarly, at least one corresponding sensor 38 is mounted on the overflow pipe 34 that is configured to respond to sound propagating in the overflow pipe 34 of the cyclone 30, and to provide at least one corresponding signal containing information about sound propagating through the slurry flowing in the overflow pipe 34 of the cyclone 30. By way of example, the at least one sensors 28, 38 may take the form of a SONAR-based clamp-around flow meter, which is known in the art consistent with that described below. The SONAR-based clamp-around flow meters 28, 38 may be clamped in whole or in part around some portion of the overflow pipes 24, 34. For example, the at least one sensor or meter 28, 38 may be mounted on the top of the overflow pipes 24, 34, or the at least one sensor or meter 28, 38 may be mounted on the bottom of the overflow pipe 24, 34. Alternatively, a pair of at least one sensor or meter 28, 38 may be mounted on the overflow pipes 24, 34, e.g., with one sensor or meter mounted on the top of the overflow pipes 24, 34, and with another sensor or meter mounted on the bottom of the overflow pipe 24, 34.

By way of example, in operation the SONAR-based clamp-around flow meters 28, 38 may be configured to respond to a strain imparted by the slurry, e.g., made up of water and fine particles, flowing in the overflow pipes 24, 34 of the cyclones 20, 30, and provide the signals along signal paths or lines 28a, 38a containing information about sound propagating through the slurry flowing in the overflow pipes 24, 34 of the cyclones 20, 30.

The Problem Addressed by the Present Application

Consistent with that set forth above, classification in industrial processing circuits is often performed using such hydrocyclones as shown in FIGS. 2-3.

Hydrocyclones are inherently simple devices with no moving parts and are typically arranged in a cluster or pack of multiple units. Each individual cyclone unit is fed from a common distribution header and it is assumed that each individual cyclone unit receives and equal feed flow and the performance of each is similar. However, in practice this is not the case due to a number of factors including wear of the cyclone apex and/or vortex finder and damage to the hydrocyclone.

As the cyclone apex wears over time and becomes larger, there is an increase in the fraction of material reporting to the underflow. Furthermore, the percent solids of the underflow decreases and the excess water carriers fine particles to the underflow. In a closed circuit ball mill, this can have significant impact to grinding efficiency since particles that are of product size are returning to the ball mill and taking up volume which could be otherwise used to grind larger particles. In some cases, the wear can be significant enough to impact the particle size distribution and flow pattern of the overflow stream.

As the cyclone vortex finder wears over time, the cut point of the cyclone will increase leading to a larger particle size distribution in the overflow stream. This negatively impacts the performance of the downstream process since the material size is too large for efficient valuable mineral recovery.

With no moving parts, the hydrocyclone relies heavily on its internal dimensions and geometry to achieve the desired classification. Any damage to the internal structure of the hydrocyclone (i.e. liner coming free, missing liner piece or holes) will lead to sub-optimal performance. Furthermore, hydrocyclones are assembled in sections and a misalignment of two or more sections can create a step change in the internal wall which in turn leads to a drop in performance.

Currently, the method of determining cyclone wear or damage is through physical measurements of the cyclone dimensions which require at least the cyclone to be offline and in some cases the whole cyclone cluster.

In view of this, there is a need in the industry for a better way for determining cyclone wear or damage, especially by eliminating the requirement that at least one cyclone be offline and in some cases the whole cyclone cluster in order to make such a determination.

SUMMARY OF THE INVENTION

The Present Invention

The present invention provides a new and unique technique for determining cyclone wear or damage, e.g., through measurement of the cyclone overflow stream in real time, individual cyclone wear or damage can be inferred providing a maintenance and operational efficiency benefit. By way of example, this can be accomplished by directly measuring the acoustic noise generated by the slurry hitting a probe, e.g., including a particle size tracking (PST) probe developed by the assignee of the present invention and known in the industry as CYCLONEtrac™. This acoustic noise profile can be correlated to the slurry flow pattern which in turn indicates the status of the hydrocyclone apex diameter. This diagnostic capability is provided while the hydrocyclone is operating so the cyclone does not have to be taken out of operation for manual inspection. This new trending capability enables new predictive maintenance strategies based on condition based monitoring as opposed to time based replacement, e.g., that is known in the art.

Particular Embodiments

In its broadest sense, the new and unique techniques, e.g., may include, or take the form of, a method and/or an apparatus, to optimize the performance of individual cyclones operating in a battery of cyclones.

According to some embodiments of the present invention, the apparatus may comprise at least one signal processor or signal processing module configured at least to:
receive signaling containing information about an acoustic noise profile that is measured and generated by a slurry hitting a probe configured in a part of a cyclone; and
determine corresponding signaling containing information about the status of the part of the cyclone, based upon the signaling received.

The apparatus may also include one or more of the following features:

The signal processor or signal processing module may be configured to provide the corresponding signaling, including where the corresponding signaling provided contains information about whether the part of the cyclone is damaged or worn.

The part of the cyclone may be an apex of the cyclone, and the corresponding signaling contains information about the status of the apex of the cyclone.

The part of the cyclone may be the cyclone vortex finder, and the corresponding signaling contains information about the status of the cyclone vortex finder.

The signal processor or signal processing module may be configured to correlate the acoustic noise profile to a slurry flow pattern which indicates the status of the part of the cyclone.

The signal processor or signal processing module may be configured to determine the status of the part of the cyclone based upon fluctuations in the acoustic noise profile, including the acoustic noise profile of a worn or damaged part of the cyclone has higher or less stable statistical fluctuations in probe measurements, and a corresponding acoustic noise profile of a non-worn or non-damaged part of the cyclone has lower or more stable statistical fluctuations in the probe measurements than the acoustic noise profile of the worn or damaged part of the cyclone.

The corresponding signaling provided may contain an indication about the status of the part of the cyclone, including where the indication is a graph showing the statistical fluctuations in the probe measurements for visual interpretation by a plant manager about the status of the part of the cyclone, or including where the indication is an alarm signal alerting the plant manager about the status of the part of the cyclone. The alarm signal may be an audio signal, or a visual signal (e.g., a blinking light), or some combination thereof.

The signal processor or signal processing module may be configured, through measurements of a cyclone overflow stream in real time, to determine individual cyclone wear or damage.

The signal processor or signal processing module may be configured to determine trending capability of cyclone wear or damage that enables predictive maintenance strategies based on condition monitoring instead of time-based replacement, based upon the signaling received. For example, based upon trending capability of cyclone wear or damage determined, the signal processor or signal processing module may be configured to implement predictive maintenance algorithms to determine predictive maintenance strategies to manage the replacement of the part of the cyclone. The predictive maintenance algorithms may be based upon developing a forward-moving database that includes data containing information about cyclones, cyclone parts, wear patterns of cyclone parts, replacement events of cyclone parts in the past, predicted replacement events of cyclone parts in the future, cyclone running times, types of slurry being processed, amount of slurry being processed, etc.

The signal processor or signal processing module may be configured to provide diagnostic capability in real time while the cyclone is operating so the cyclone does not have to be taken out of operation for manual inspection, based upon the signaling received.

The apparatus may include the probe. The probe may be a particle size tracking probe.

The apparatus may include the cyclone having a cyclone part, like an apex, with the probe configured therein.

According to some embodiments, the present invention may take the form of apparatus for detection of cyclone wear or damage using individual cyclone overflow measurement, featuring a signal processor or signal processing module configured to: receive signaling containing information about an acoustic noise profile that is directly measured and generated by a slurry hitting a probe configured in an apex of a cyclone; and determine corresponding signaling containing information about the diameter of the apex of the cyclone in real time based upon fluctuations in the acoustic noise profile in the signaling received. The signal processor or signal processing module may be configured to provide the corresponding signaling, including where the corresponding signaling contains information about whether the apex of the cyclone is damaged or worn. The corresponding signaling may contain information for generating a graph showing statistical fluctuations in probe measurements over time for visual interpretation by a plant manager in order to assess the status of the diameter of the apex of cyclone. Alternatively, the corresponding signaling may contain information for generating an alarm signal alerting a plant manager about the status of the diameter of the apex of the cyclone, including where the alarm signal is an audio signal, or a visual signal, or some combination thereof.

According to some other embodiments, the present invention may take the form of a method featuring steps for receiving in a signal processor or signal processing module signaling containing information about an acoustic noise profile that is measured and generated by a slurry hitting a probe configured in a part of a cyclone; and determining in the signal processor or signal processing module corresponding signaling containing information about the status of the part of the cyclone, based upon the signaling received.

The signal processor or signal processor module may take the form of a signal processor and at least one memory including a computer program code, where the signal processor and at least one memory are configured to cause the apparatus to implement the functionality of the present invention, e.g., to respond to signaling received and to determine the corresponding signaling, based upon the signaling received.

According to some embodiment, the present invention may take the form of apparatus comprising means for responding to signaling containing information about an acoustic noise profile that is measured and generated by a slurry hitting a probe configured in a part of a cyclone; and means for determining corresponding signaling containing information about the status of the part of the cyclone, based upon the signaling received, consistent with that set forth herein.

According to some embodiments of the present invention, the apparatus may also take the form of a computer-readable storage medium having computer-executable components for performing the steps of the aforementioned method. The computer-readable storage medium may also include one or more of the features set forth above.

One advantage of the present invention is that it provides a better way for determining cyclone wear or damage, especially by eliminating the requirement that at least one cyclone be offline and in some cases the whole cyclone cluster.

BRIEF DESCRIPTION OF THE DRAWING

The drawing includes FIGS. 1A-13, which are not necessarily drawn to scale, as follows:

FIG. 1A is a block diagram of a mineral extraction processing system in the form of a copper concentrator that is known in the art.

FIG. 1B is a block diagram showing typical processing stages of a mineral extraction processing system that is known in the art.

FIG. 2 is a block diagram showing a classification stage that is known in the art.

FIG. 3 is a diagram showing a cyclone battery, sensors, a signal processor and a remote computer processor that is known in the art.

FIG. 4A shows a block diagram of apparatus, e.g., having a signal processor or signal processing module for implementing signal processing functionality, according to some embodiments of the present invention.

FIG. 4B is a diagram showing a cyclone having a probe arranged on one or more parts of the cyclone, including underflow portion, according to some embodiments of the present invention.

FIG. 6 shows a graph for application 1 of cyclone acoustic readings over time a 12 hour time span taken, according to some embodiments of the present invention.

FIG. 7 shows photos of an acoustic measurement probe for the application 1 after an inspection, including FIG. 7A that shows a photo of an upside of the acoustic measurement probe for the application 1, FIG. 7B that shows a photo of a right side of the acoustic measurement probe for the application 1, and FIG. 7C that shows a photo of a downside of the acoustic measurement probe for the application 1.

FIG. 8 shows photos of an inside of an overflow (O/F) pipe that forms part of the cyclone in the application 1, including FIG. 8A that shows an original photo of the O/F pipe for the application 1, and FIG. 8B that shows an edge-filtered photo of the O/F pipe for the application 1.

FIG. 9 shows graphs (%+150 microns vs. time) of PST measurements in 1 minute intervals of the cyclone before (FIG. 9A) and after (FIG. 9B) replacement.

FIG. 11 shows photos of an acoustic measurement probe for the application 2 after an inspection, including FIG. 11A that shows a photo of an downside of the acoustic measurement probe for the application 2, FIG. 11B that shows a photo of a right side of the acoustic measurement probe for the application 2, and FIG. 11C that shows a photo of a upside of the acoustic measurement probe for the application 2.

FIG. 12 shows two photos of inside portions of an overflow (O/F) pipe at two pipe locations that forms part of the cyclone in the application 2 and a photo of an outside of the O/F pipe with the two pipe locations identified, including FIG. 12A that shows a photo of the O/F pipe at a first pipe location (see left side arrow in FIG. 12C) for the application 2, and FIG. 12B that shows a photo of the O/F pipe at a second pipe location (see right side arrow in FIG. 12C) for the application 2, and FIG. 12C that shows the photo of an outside of the O/F pipe with the two locations.

DETAILED DESCRIPTION OF BEST MODE OF THE INVENTION

Summary of Basic Invention

Figure 5:
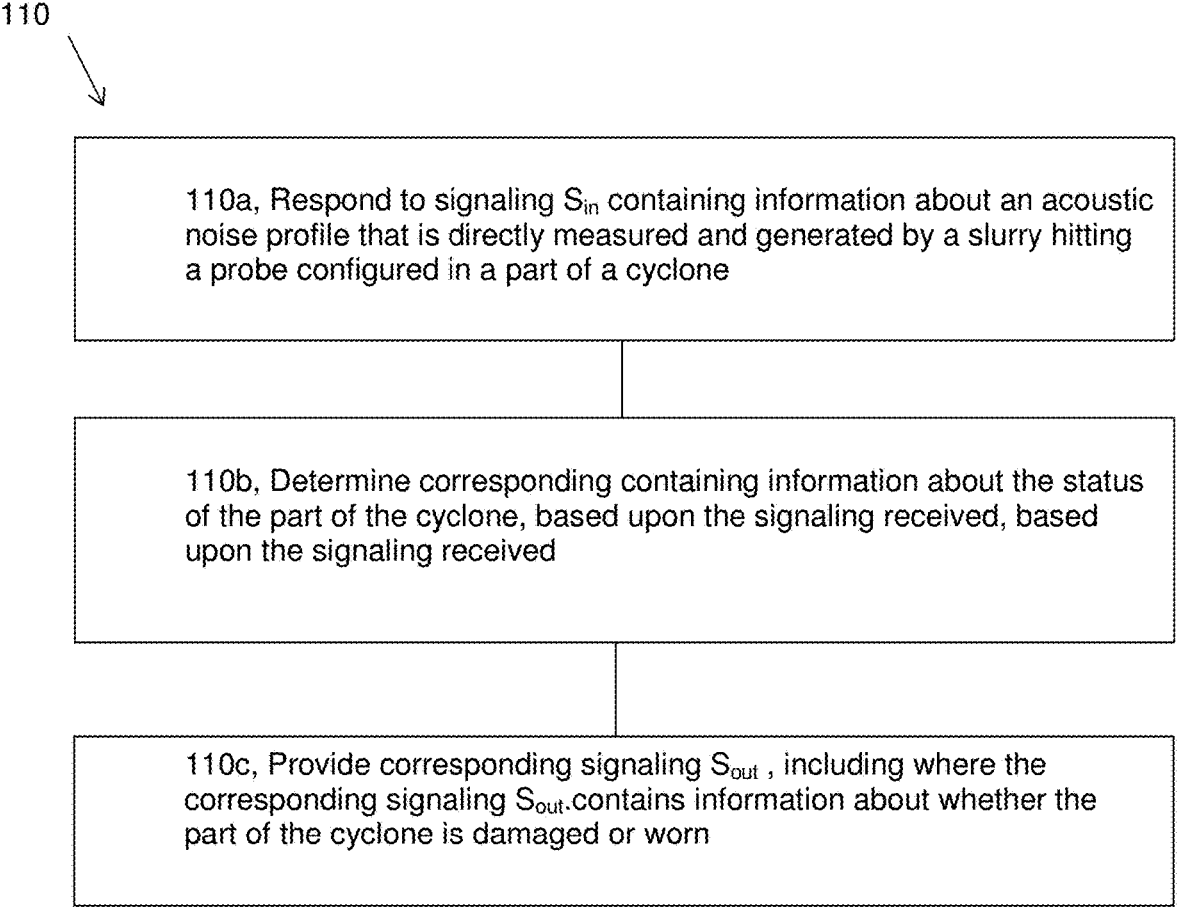
FIG. 5 shows a block diagram of a flowchart for a method, according to some embodiments of the present invention.

In general, the present invention provides new and unique techniques for determining cyclone wear or damage, e.g., through measurement of the cyclone overflow stream in real time, individual cyclone wear or damage can be inferred providing a maintenance and operational efficiency benefit. This will be accomplished by directly measuring the acoustic noise generated by the slurry hitting a probe, e.g., including a particle size tracking (PST) probe developed by the assignee of the present invention and known in the industry as CYCLONEtrac™. This acoustic noise profile can be correlated to the slurry flow pattern which in turn indicates the status of the hydrocyclone apex diameter. This diagnostic capability is provided while the hydrocyclone is operating so the cyclone does not have to be taken out of operation for manual inspection. This new trending capability enables new predictive maintenance strategies based on condition based monitoring as opposed to the known time based replacement strategies.

FIG. 4A

By way of example, FIG. 4A shows apparatus generally indicated as 100, e.g. having at least one signal processor or signal processing module 102 for implementing the signal processing functionality according to the present invention. In operation, the at least one signal processor or signal processing module 102 may be configured at least to:

receive signaling $S_{in}$ containing information about an acoustic noise profile that is measured and generated by a slurry hitting a probe (e.g., see probe 128a (FIG. 4B)) configured in a part of a cyclone; and determine corresponding signaling $S_{out}$ containing information about the status of the part of the cyclone, based upon the signaling received.

By way of example, the signaling $S_{in}$ may be received from a CYCLONEtrac™ PST probe 128a that may be mounted on the part of the cyclone. (See FIGS. 7-8 and 11 that show photos of the probe arranged in the part of the cyclone.)

The at least one signal processor or signal processing module 102 may also be configured to determine the corresponding signaling containing information about the status of the part of the cyclone, based upon the signaling received. A person skilled in the art would appreciate and understanding without undue experimentation, especially after reading the instant patent application together with that known in the art, e.g., how to implement suitable signaling suitable processing functionality to make one or more such determinations.

The at least one signal processor or signal processing module 102 may be configured to provide the corresponding signaling $S_{out}$. By way of example, the corresponding signaling $S_{out}$ provided may include, take the form of, or contain information about whether the part of the cyclone is damaged or worn.

According to some embodiments of the present invention, the apparatus 100 may also include, e.g., one or more probes like element 128a, a cyclone like element 120, the battery of cyclones like element 120, etc., e.g., consistent with that set forth herein.

FIG. 4B

By way of example, FIG. 4B shows a cyclone 120 according to some embodiments of the present invention, e.g., that may form part of the hydrocyclone battery shown in FIG. 3 or some other hydrocyclone battery for implementing the present invention. The cyclone 120 has a cylindrical section 122 with an inlet portion 122a for receiving via the feed pipe 9 (see FIG. 2) the feed from the grinding stage (see FIG. 1B), has an overflow pipe 124 for providing some portion of the fine slurry or slurry feed to either the flotation stage (FIG. 1B), or the hydrocyclone split 16 (FIG. 2), and has a conical base section 126 with an underflow outlet 126a for providing a remaining portion of the fine slurry or slurry feed, e.g., back for reprocessing in the grinding stage (FIG. 2).

In FIG. 4B, the cyclone 120 has at least one probe labeled 128a arranged in relation to the underflow portion 126a of the cyclone 120. The probe 128a is known in the art, and may take the form of a CYCLONEtrac™ PST probe that was developed by the assignee of the instant patent application. In operation, the probe 128a may be configured to provide the signaling $S_{in}$ to the signal processor or processing module 102, e.g., containing information about the acoustic noise profile that is directly measured and generated by the slurry hitting the probe configured in relation to the underflow portion 126a of the cyclone.

In FIG. 4B, the cyclone 120 may include other probes labeled 128b, 128c, 128d, 128e, e.g., arranged in relation to other parts or portions of the cyclone 120, including the cylindrical section 122, the inlet portion 122a, the overflow pipe 124 and/or the conical base section 126. The scope of the invention is not intended to be limited to any particular arrangement of any particular number of probes like element 128a, 128b, 128c, 128d, 128e on any particular parts or portion of the cyclone 120 like elements the cylindrical section 122, the inlet portion 122a, the overflow pipe 124, the conical base section 126 and/or the underflow portion 126a.

It is note that a person skilled in the art would appreciate and understanding without undue experimentation, especially after reading the instant patent application together with that known in the art, e.g., how to implement suitable signaling processing functionality in the signal processor or signal processing module 102 (FIG. 4A) to receive such signaling containing such information from such a CYCLONEtrac™ PST probe like element 128a, as well as how to adapt such a CYCLONEtrac™ PST probe like element 128a to implement suitable signaling processing functionality to provide such signaling containing such information to the signal processor or signal processing module 102.

The Signal Processor or Processor Module 102

The functionality of the signal processor or processor module 102 may be implemented using hardware, software, firmware, or a combination thereof. In a typical software implementation, the processor module may include one or more microprocessor-based architectures having a microprocessor, a random access memory (RAM), a read only memory (ROM), input/output devices and control, data and address buses connecting the same, e.g., consistent with that shown in FIG. 4A, e.g., see element 104. A person skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

By way of example, the apparatus 100 may also include, e.g., other signal processor circuits or components 104 that do not form part of the underlying invention, e.g., including input/output modules, one or more memory modules, data, address and control busing architecture, etc. In operation, the at least one signal processor or signal processing module 102 may cooperation and exchange suitable data, address and control signaling with the other signal processor circuits or components 104 in order to implement the signal processing functionality according to the present invention. By way of example, the signaling $S_{in}$ may be received by such an input module, provided along such a data bus and stored in such a memory module for later processing, e.g., by the at least one signal processor or signal processing module 102. After such later processing, processed signaling resulting from any such determination may be stored in such a memory module, provided from such a memory module along such a data bus to such an output module, then provided from such an output module as the corresponding signaling $S_{out}$, e.g., by the at least one signal processor or signal processing module 102.

FIG. 5

FIG. 5 shows a method generally indicated as 110 having steps 110a, 110b and 110c for implementing the signal processing functionality, e.g., with at least one signal processor or signal processing module like element 102 in FIG. 4, according to some embodiments of the present invention.

The method 100 may include a step 110a for responding with at least one signal processor or signal processing module to signaling containing information about an acoustic noise profile that is measured and generated by a slurry hitting a probe configured in a part of a cyclone; and a step 110b for determining with the at least one signal processor or signal processing module corresponding signaling containing information about the status of the part of the cyclone, based upon the signaling received. The method 100 may also include a step 110c for providing the corresponding signaling the corresponding signaling, including where the corresponding signaling provided contains information about whether the part of the cyclone is damaged or worn.

The method may also include one or more steps for implementing other features of the present invention set forth herein, including steps for making the various determinations associated with the statistical algorithm or technique, e.g., consistent with that set forth herein.

FIG. 6

FIG. 6 shows a graph for application 1 of cyclone acoustic readings over time a 12 hour time span taken, according to some embodiments of the present invention. The graph includes indications showing statistical fluctuations in the probe measurements, e.g., which once generated according to the present invention may be visually interpreted to determine the status of the part of the cyclone. In FIG. 6, the statistical fluctuations in the probe measurements include fluctuations designated by the term "Bad" that includes fluctuations identified by white diamonds, a shaded square, an unfilled triangle.

FIG. 7

FIG. 7 shows photos of an acoustic measurement probe for the application 1 after an inspection. For example, FIG. 7A shows a photo of an upside of the acoustic measurement probe for the application 1; FIG. 7B shows a photo of a right side of the acoustic measurement probe for the application 1; and FIG. 7C shows a photo of a downside of the acoustic measurement probe for the application 1. The photo in FIG. 7 show that, when the acoustic measurement (PST) probe in the application 1 was inspected, buildup was found on the upside and downside of the probe, only the end of the upside area was clean, therefore only the end of the probe was hit by the slurry passing through the cyclone overflow line.

FIG. 8

FIG. 8 shows photos of an inside of an overflow (O/F) pipe that forms part of the cyclone in the application 1. By way of example, FIG. 8A shows an original photo of the O/F pipe for the application 1; and FIG. 8B shows an edge-filtered photo of the O/F pipe for the application 1. The photo in FIG. 8 show that slurry flow lines inside the cyclone overflow pipe confirming that slurry was only touching the end of the PST probe. In addition, during experimentation, the apex diameter of the hydrocyclone was measured by maintenance crew and determined to be out of specification. Based upon this, the hydrocyclone was replaced.

FIG. 9

FIG. 9 shows graphs (%+150 microns vs. time) of PST measurements in 1 minute intervals of the cyclone before (FIG. 9A) and after (FIG. 9B) replacement. The graphs in FIG. 9 show that PST measurements with the hydrocyclone before replacement had a higher fluctuation (i.e., identified by a broader signal fluctuation range), and the PST measurements with a new hydrocyclone are more stable (i.e., identified by a narrower signal fluctuation range).

Figure 10:
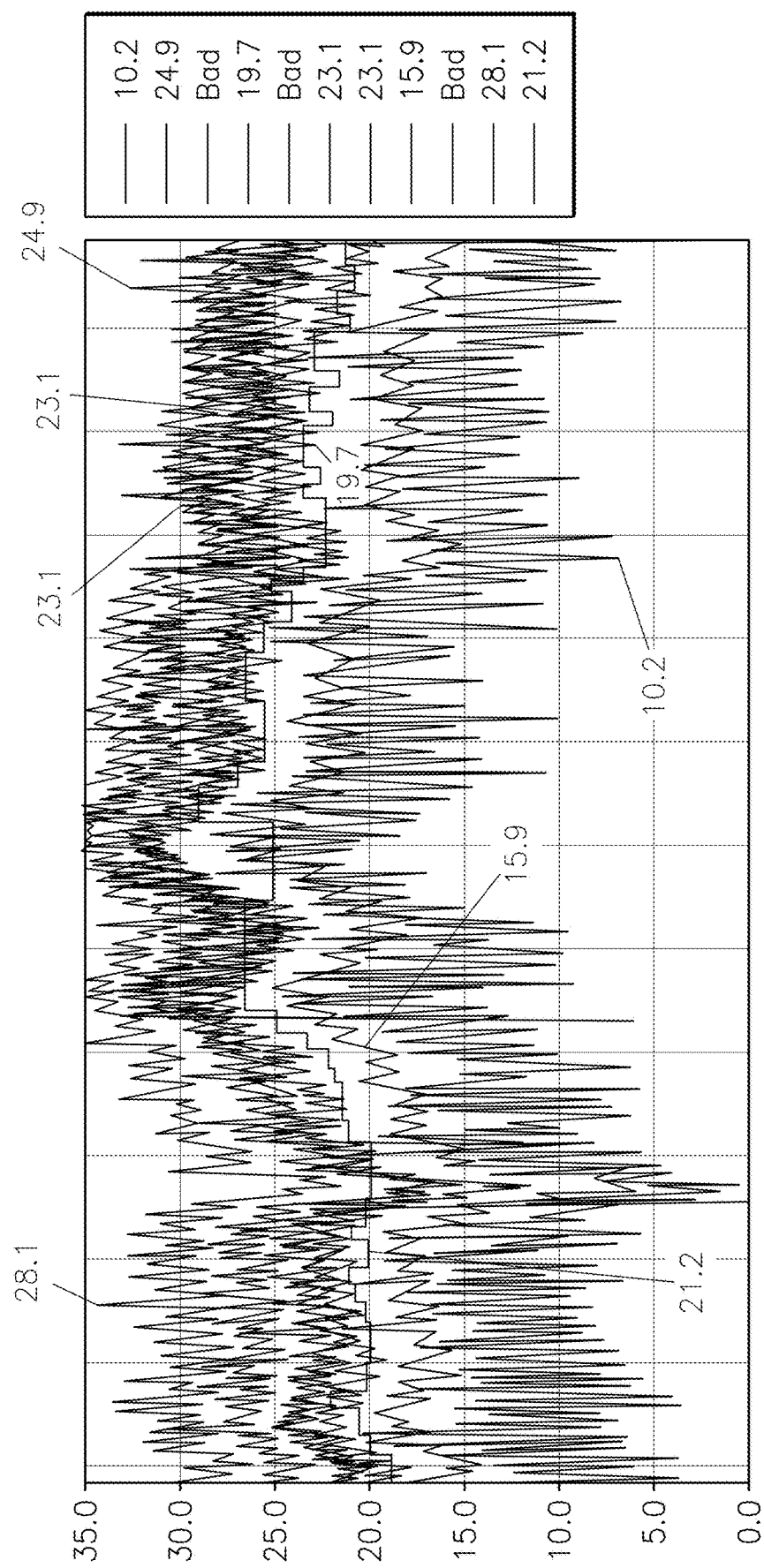
FIG. 10 shows a graph for application 2 of cyclone acoustic readings over time a 12 hour time span taken, according to some embodiments of the present invention.

FIG. 10: Application 2

FIG. 10 shows a graph for application 2 of cyclone acoustic readings taken over a 12 hour time span, according to some embodiments of the present invention. The graph shows that the application 2 also demonstrated poor performance due to a worn apex. In FIG. 10, the graph includes indications showing statistical fluctuations in the probe measurements, e.g., which once generated according to the present invention may be visually interpreted to determine the status of the part of the cyclone. In FIG. 10, the statistical fluctuations in the probe measurements include fluctuations designated by the term "Bad" that includes fluctuations identified by white diamonds, a shaded square, an unfilled triangle.

FIG. 11

FIG. 11 shows photos of an acoustic measurement probe for the application 2 after an inspection, including FIG. 11A that shows a photo of an downside of the acoustic measurement probe for the application 2, FIG. 11B that shows a photo of a right side of the acoustic measurement probe for the application 2, and FIG. 11C that shows a photo of a upside of the acoustic measurement probe for the application 2.

The photos in FIG. 11 show that atypical buildup was found on the downside of the probe, and that the thickness of the buildup was greater than the buildup thickness found in other PST probes. Based upon this, it appears that the PST probe is not impacted by slurry all the time or the hydrocyclone was operating sporadically.

FIG. 12

FIG. 12 shows two photos of inside portions of an overflow (O/F) pipe at two pipe locations that forms part of the cyclone in the application 2 and a photo of an outside of the O/F pipe with the two pipe locations identified, including FIG. 12A that shows a photo of the O/F pipe at a first pipe location (see left side arrow in FIG. 12C) for the application 2, and FIG. 12B that shows a photo of the O/F pipe at a second pipe location (see right side arrow in FIG. 12C) for the application 2, and FIG. 12C that shows the photo of an outside of the O/F pipe with the two pipe locations. In summary, during experimentation the photos in FIG. 12 show that the O/F pipe didn't have slurry flow lines.

FIG. 13

Figure 13:
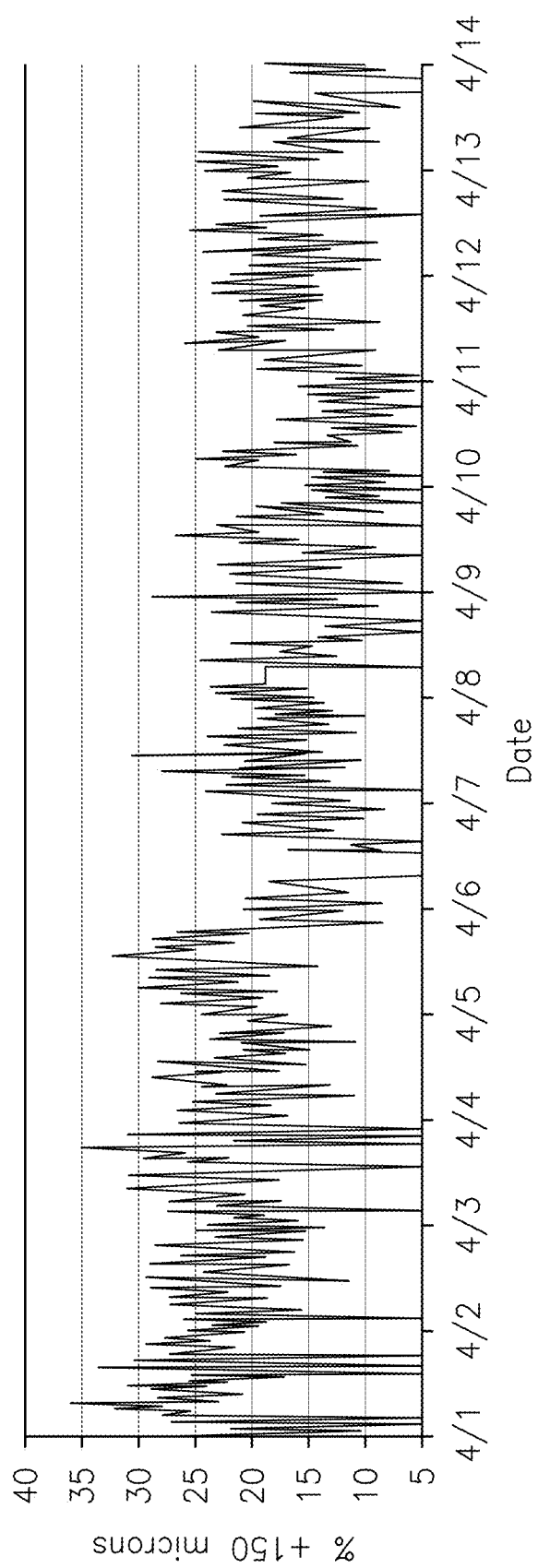
FIG. 13 shows a graph (%+150 microns vs. time) of PST measurements in 5 minute intervals of the cyclone before replacement.

FIG. 13 shows a graph (%+150 microns vs. time) of PST measurements for application 2 in 5 minute intervals of the cyclone before replacement. The graph in FIG. 13 shows that the PST measurements before hydrocyclone replacement had a high fluctuation.

Comments and Conclusions

Based on literature known in the prior art, if the apex diameter of a cyclone is too large, then there is an increment in the ratio of underflow flow rate to overflow flow rate. Also, the % solids of the underflow decreases and the excess of water carries unclassified fine particles to the underflow affecting the performance of the hydrocyclone.

When the apex diameter of the hydrocyclones is too large, the overflow flow rate decreases, this flow rate decrement affects the flow path of slurry in the O/F pipe and slurry is not hitting the PST probe causing fluctuation in the PST readings.

PST measurement readings according to the present invention are able to provide an indication of cyclone wear.

The Determination of a Damaged/Worn Cyclone Part

By way of example, the determination of a damaged or worn cyclone part may take the form of one or more of the following techniques:

For example, the corresponding signaling provided from the signal processor or processing module 102 may contain an indication about the status of the part of the cyclone, including where the part is an apex of the cyclone. The indication may tale the form of a graph showing the statistical fluctuations in the probe measurements for visual interpretation by a plant manager about the status of the part of the cyclone. Alternatively, the indication may take the form of an alarm signal alerting the plant manager about the status of the part of the cyclone. The alarm signal may be an audio signal, or a visual signal (e.g., one or more blinking lights), or some combination thereof.

CYCLONEtrac™ PST Probe Like Element 128a

As one skilled in the art would appreciate, the CYCLONEtrac™ Particle Size Tracking (PST) Probe like element 128a was developed by the assignee of the present invention and is known in the art. The reader is referred to the aforementioned patent application serial no. PCT/US14/52628 (712-2.410-1//CCS-0124) for a more comprehensive discussion of the same, e.g., including that set forth in relation to FIG. 3C therein.

The Classification Stage 10

By way of example, the present invention as it relates to the classification stage 10 is described in relation to the mineral extraction processing system shown, e.g., in FIGS. 1A and 1B, which takes the form of a copper concentrator, although the scope of the invention is not intended to be limited to any particular type or kind of mineral process or mineral extraction processing system either now known or later developed in the future.

The classification stage 10 may also include one or more elements, devices, apparatus or equipment that are known in the art, do not form part of the underlying invention, and are not disclosed herein or described in detail for that reason.

The scope of the invention re classification stage and/or hydrocyclone applications is not intended to be limited to the type or kind of mineral being processed, or the type of mineral process, either now known or later developed in the future. By way of example, the scope of the invention is intended to include hydrocyclone applications include Molybdenum, Lead, Zinc, Iron, Gold, Silver, Nickel, Fluorite, Tantalum, Tungsten, Tin, Lithium, Coal, as well as, e.g. diamonds, etc.

FIG. 3: The Cyclone or Hydrocyclone 20, 30

The cyclone or hydrocyclone, e.g., like elements 20, 30 in FIG. 3, are known in the art, and the scope of the invention is not intended to be limited to any particular type or kind thereof either now known or later developed in the future. The scope of the invention is intended to include implementing the present invention in relation to cyclone or hydrocyclone, e.g., like elements 20, 30, that are now known, as well as those later developed in the future.

Applications Re Other Industrial Processes

By way of example, the present invention is described in relation to, and part of, a mineral extraction processing system for extracting minerals from ore. However, the scope of the invention is intended to include other types or kinds of industrial processes either now known or later developed in the future, including any mineral process, such as those related to processing substances or compounds that result from inorganic processes of nature and/or that are mined from the ground, as well as including either other extraction processing systems or other industrial processes, where the sorting, or classification, of product by size is critical to overall industrial process performance.

Hydrocyclone Performance Monitoring Products and Patents

By way of example, the assignee of the instant patent application has developed hydrocyclone performance monitoring products, which are disclosed in one or more of the following granted U.S. Patent(s): U.S. Pat. Nos. 6,354,147; 6,435,030; 6,587,798; 6,601,458; 6,609,069; 6,691,584; 6,732,575; 6,813,962; 6,862,920; 6,889,562; 6,988,411; 7,032,432; 7,058,549; 7,062,976; 7,086,278; 7,110,893; 7,121,152; 7,127,360; 7,134,320; 7,139,667; 7,146,864; 7,150,202; 7,152,003; 7,152,460; 7,165,464; 7,275,421; 7,359,803; 7,363,800; 7,367,240; 7,343,820; 7,437,946; 7,529,966; and 7,657,392, which are all incorporated by reference in their entirety. The disclosure herein related to the present invention is intended to be interpreted consistent with the family of technologies disclosed in all the issued patents incorporated by reference herein.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus having a cyclone, comprising:
  a probe mounted or arranged inside a part of a cyclone, and configured to measure an acoustic noise profile generated by a slurry flowing in the part of the cyclone and hitting the probe, and provide signaling containing information about the acoustic noise profile generated; and
  a signal processor or signal processing module configured to:
    receive the signaling; and
    provide corresponding signaling containing information about the status of the part of the cyclone by correlating statistical fluctuations in the acoustic noise profile measured and generated of the slurry hitting the probe in real time, based upon the signaling received;
  wherein a correlation of the statistical fluctuations is based on associated statistical fluctuations in an associated acoustic noise profile of a worn or damaged part of the cyclone having higher or less stable statistical fluctuations in probe measurements, and corresponding statistical fluctuations in a corresponding noise profile of a non-worn or non-damaged part of the cyclone having lower or more stable statistical fluctuations in the probe measurements than the associated acoustic noise profile of the worn or damaged part of the cyclone.

2. Apparatus according to claim 1, wherein the corresponding signaling provided contains information about whether the part of the cyclone is damaged or worn.

3. Apparatus according to claim 1, wherein the part of the cyclone is an apex of the cyclone, and the corresponding signaling contains information about the status of the apex of the cyclone.

4. Apparatus according to claim 1, wherein the acoustic noise profile indicates the status of the part of the cyclone.

5. Apparatus according to claim 1, wherein the signal processor or signal processing module is configured, through measurements of a cyclone overflow stream in real time, to determine individual cyclone wear or damage.

6. Apparatus according to claim 1, wherein the signal processor or signal processing module is configured to determine trending capability of cyclone wear or damage that enables predictive maintenance strategies based on condition monitoring instead of time-based replacement.

7. Apparatus according to claim 1, wherein the signal processor or signal processing module is configured to provide diagnostic capability in real time while the cyclone is operating so the cyclone does not have to be taken out of operation for manual inspection.

8. Apparatus according to claim 1, wherein the apparatus comprises a mineral extraction processing system.

9. Apparatus according to claim 1, wherein the probe is a particle size tracking probe mounted or arranged inside the part of the cyclone.

10. Apparatus according to claim 1, wherein the cyclone includes a cyclone part with the probe configured therein.

11. Apparatus according to claim 1, wherein the apparatus comprises a mineral extraction processing system including at least one cyclone having an overflow pipe with the probe mounted or arranged in the overflow pipe.

12. Apparatus according to claim 1, wherein the information about the status of the part of the cyclone includes data to generate a graph of the statistical fluctuations in the acoustic noise profile, which once generated can be visually interpreted to determine wear or damage of the part of the cyclone.

13. A method comprising:
mounting or arranging a probe inside a part of a cyclone;
measuring an acoustic noise profile generated by a slurry flowing in the part of the cyclone and hitting the probe, and providing signaling containing information about the acoustic noise profile generated;
receiving in a signal processor or signal processing module the signaling; and
providing from the signal processor or signal processing module corresponding signaling containing information about the status of the part of the cyclone by correlating statistical fluctuations in the acoustic noise profile measured and generated of the slurry hitting the probe in real time, based upon the signaling received;
wherein a correlation of the statistical fluctuations is based on associated statistical fluctuations in an associated acoustic noise profile of a worn or damaged part of the cyclone having higher or less stable statistical fluctuations in probe measurements, and corresponding statistical fluctuations in a corresponding noise profile of a non-worn or non-damaged part of the cyclone having lower or more stable statistical fluctuations in the probe measurements than the associated acoustic noise profile of the worn or damaged part of the cyclone.

14. A method according to claim 13, wherein the corresponding signaling provided contains information about whether the part of the cyclone is damaged or worn.

15. A method according to claim 13, wherein the part of the cyclone is an apex of the cyclone, and the corresponding signaling contains information about the status of the apex of the cyclone.

16. A method according to claim 13, wherein the acoustic noise profile indicates the status of the part of the cyclone.

17. A method according to claim 13, wherein the method comprises configuring the signal processor or signal processing module, through measurements of a cyclone overflow stream in real time, to determine individual cyclone wear or damage.

18. A method according to claim 13, wherein the signal processor or signal processing module is configured to determine trending capability of cyclone wear or damage that enables predictive maintenance strategies based on condition monitoring instead of time-based replacement.

19. A method according to claim 13, wherein the signal processor or signal processing module is configured to provide diagnostic capability in real time while the cyclone is operating so the cyclone does not have to be taken out of operation for manual inspection.

20. A method according to claim 13, wherein the method further comprises configuring the probe to provide the signaling to the signal processor or signal processing module.

21. A method according to claim 20, wherein the probe is a particle size tracking probe.

22. A method according to claim 13, wherein the information about the status of the part of the cyclone includes data to generate a graph of the statistical fluctuations in the acoustic noise profile, which once generated can be visually interpreted to determine wear or damage of the part of the cyclone.

23. Apparatus for detection of cyclone wear or damage using individual cyclone overflow measurement, comprising:
a probe mounted or arranged inside an apex of a cyclone, and configured to measure an acoustic noise profile generated by a slurry flowing in the apex of the cyclone and hitting the probe, and provide signaling containing information about the acoustic noise profile generated; and
a signal processor or signal processing module configured to:
receive the signaling; and
provide corresponding signaling containing information about the diameter of the apex of the cyclone by correlating statistical fluctuations in the acoustic noise profile measured and generated of the slurry hitting the probe in real time, based upon the signaling received;
wherein a correlation of the statistical fluctuations is based on associated statistical fluctuations in an associated acoustic noise profile of a worn or damaged apex of the cyclone having higher or less stable statistical fluctuations in probe measurements, and corresponding statistical fluctuations in a corresponding noise profile of a non-worn or non-damaged apex of the cyclone of the cyclone having lower or more stable statistical fluctuations in the probe measurements than the associated acoustic noise profile of the worn or damaged apex of the cyclone.

24. Apparatus according to claim 23, wherein the corresponding signaling contains information about whether the apex of the cyclone is damaged or worn.

25. Apparatus according to claim 24, wherein the corresponding signaling contains information for generating a graph showing statistical fluctuations in probe measurements over time for visual interpretation by a plant manager in order to assess the status of the diameter of the apex of cyclone.

26. Apparatus according to claim 24, wherein the corresponding signaling contains information for generating an alarm signal alerting a plant manager about the status of the diameter of the apex of the cyclone, including where the alarm signal is an audio signal, or a visual signal, or some combination thereof.

27. Apparatus according to claim 23, wherein the information about the wear diameter of the apex of the cyclone includes data to generate a graph of the statistical fluctuations in the acoustic noise profile, which once generated can be visually interpreted to determine wear or damage of the apex of the cyclone.

28. A mineral extraction processing system, comprising:
a cyclone having an overflow pipe configured to provide a slurry;
a probe mounted or arranged inside the overflow pipe, configured to provide signaling containing information about an acoustic noise profile that is measured and generated by the slurry flowing in the overflow pipe and hitting the probe; and
a signal processor or signal processing module configured to:
receive the signaling; and provide corresponding signaling containing information about wear or damage of the overflow pipe by correlating statistical fluctuations in the acoustic noise profile measured and generated of the slurry hitting the probe in real time, based upon the signaling received;

wherein a correlation of the statistical fluctuations is based on associated statistical fluctuations in an associated acoustic noise profile of a worn or damaged overflow pipe having higher or less stable statistical fluctuations in probe measurements, and corresponding statistical fluctuations in a corresponding noise profile of a non-worn or non-damaged overflow pipe of the cyclone having lower or more stable statistical fluctuations in the probe measurements than the associated acoustic noise profile of the worn or damaged overflow pipe of the cyclone.

29. A mineral extraction processing system according to claim 28, wherein the information about the wear or damage of the overflow pipe includes data to generate a graph of the statistical fluctuations in the acoustic noise profile, which once generated can be visually interpreted to determine the wear or damage of the overflow pipe.

* * * * *